Dec. 2, 1941.   L. J. MEYER   2,264,394
NUT CRACKING MACHINE
Filed Oct. 23, 1939   3 Sheets-Sheet 1

INVENTOR
LEO J. MEYER
BY *Em Harrington*
ATTORNEY

Dec. 2, 1941.  L. J. MEYER  2,264,394
NUT CRACKING MACHINE
Filed Oct. 23, 1939   3 Sheets-Sheet 2
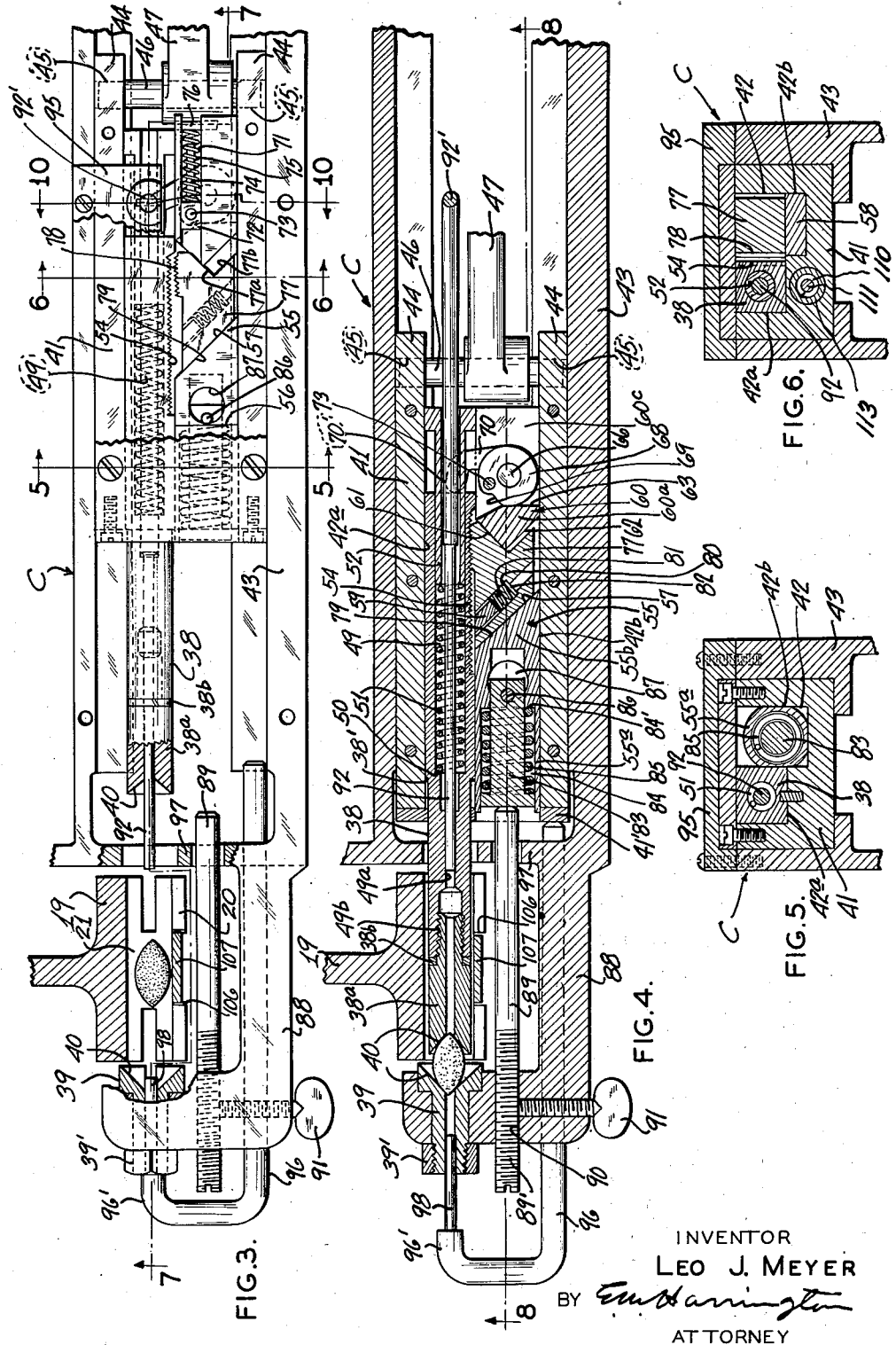
INVENTOR
LEO J. MEYER
BY *Em Harrington*
ATTORNEY

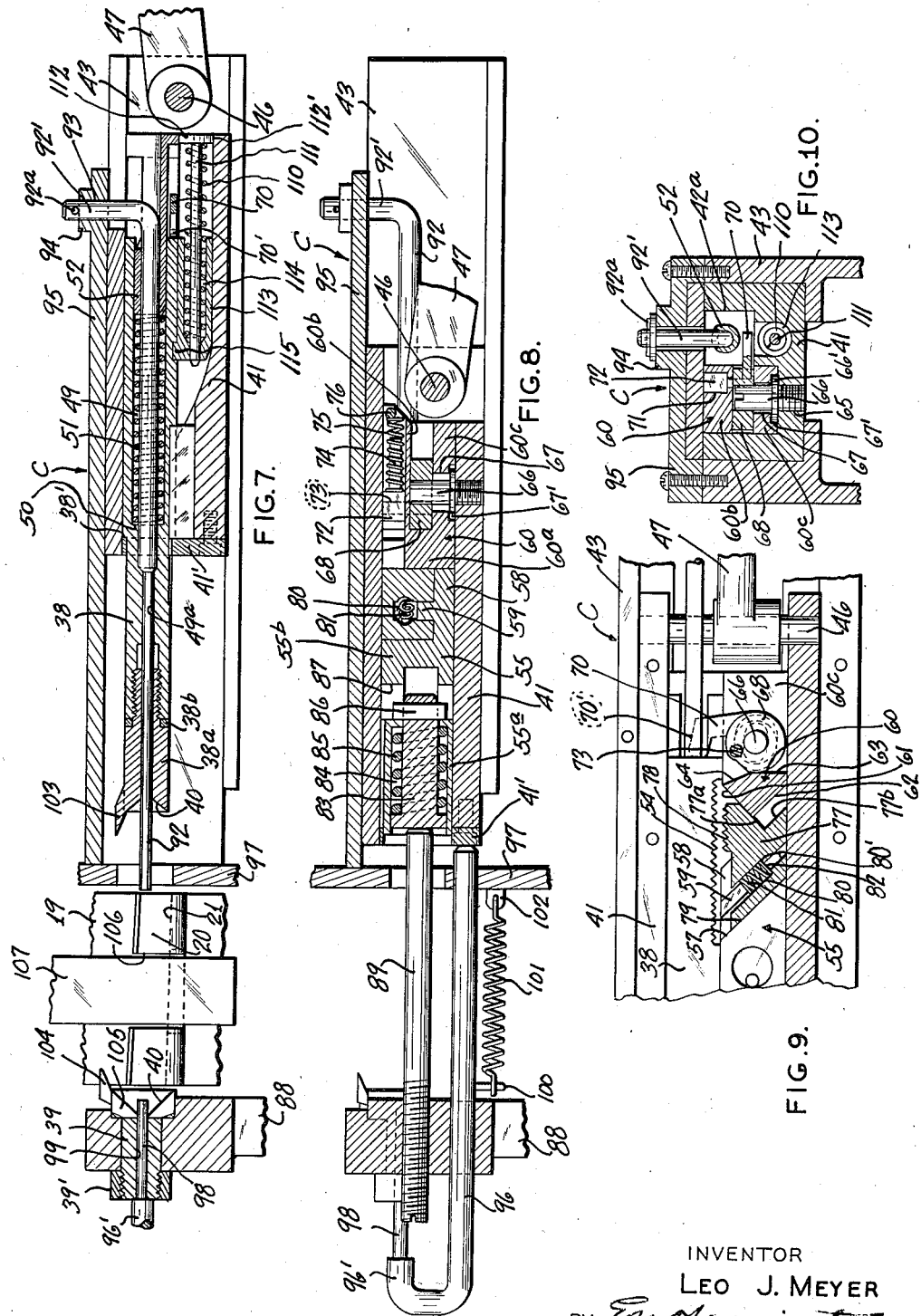

Patented Dec. 2, 1941

2,264,394

UNITED STATES PATENT OFFICE 2,264,394

NUT CRACKING MACHINE

Leo J. Meyer, San Antonio, Tex., assignor to The Champion Pecan Machine Company, San Antonio, Tex., a corporation of Texas Application October 23, 1939, Serial No. 300,733

8 Claims. (Cl. 146—12)

This invention relates generally to nut-cracking machines of the type adapted to crack edible nuts and more specifically to such a machine which is provided with an improved compensating mechanism, or cracking box as it is frequently called, the predominant object of the invention being to provide a nut-cracking machine which includes as a part thereof a compensating mechanism, or cracking box, that is of such improved construction and arrangement that the efficiency of the nut-cracking machine is very greatly improved.

It is quite generally known that edible nuts, pecans, for instance, vary in size, particularly as to length. This situation makes it necessary that machines intended for use in cracking these nuts be provided with means for compensating for differences in the sizes of nuts to be cracked, for in the absence of such compensating mechanism, cracking movement of the nut-cracking dies of the machines which would be proper for medium size nuts would be too great for longer nuts and would crush the meats thereof, while in the case of shorter nuts such die movement would not be sufficient to properly crack the nuts. It has been the practice, therefore, to provide nut-cracking machines of the type to which this invention relates, with compensating mechanisms and the main purpose of this invention is to provide a nut-cracking machine which includes as a part thereof a compensating mechanism that is of such improved construction and arrangement that it is capable of performing its intended function in an improved and highly efficient manner.

Fig. 3 is an enlarged view, partly in plan and partly in horizontal section illustrating the cracking dies of the machine and parts associated therewith.

Fig. 4 is a horizontal section of the mechanism shown in Fig. 3.

Fig. 5 is a cross-section taken on line 5—5 of Fig. 3.

Fig. 6 is a cross-section taken on line 6—6 of Fig. 3.

Fig. 7 is a vertical section taken on line 7—7 of Fig. 3.

Fig. 8 is a vertical section taken on line 8—8 of Fig. 4.

Fig. 9 is a view partly in plan and partly in section of a portion of the cracking box showing parts thereof in changed positions.

Fig. 10 is a fragmentary section taken on line 10—10 of Fig. 3.

Figure 1:
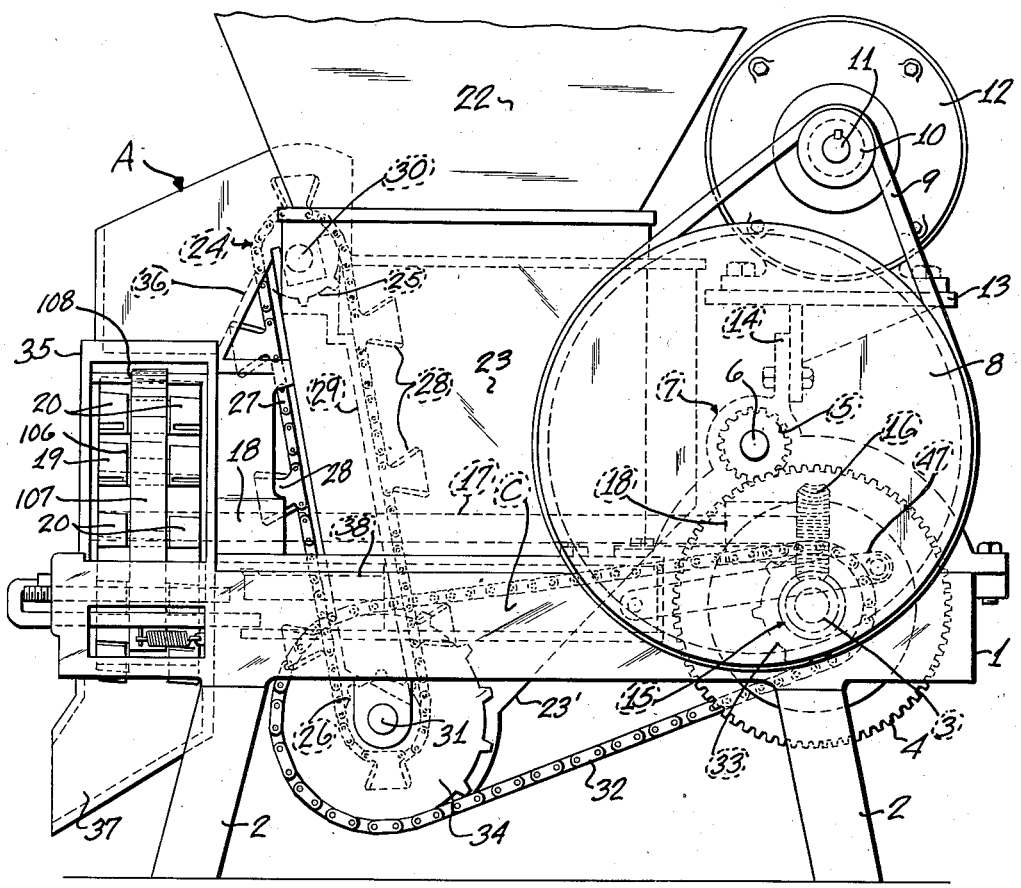
Fig. 1 is a side elevation of the improved nut cracking machine.

In the drawings, wherein is shown for the purpose of illustration, merely, one embodiment of the invention, A designates the nut-cracking machine generally.

The nut-cracking machine A includes a frame or bed 1 which is supported on suitable legs 2 and this frame or bed supports the various parts of the machine which will be hereinafter described. Extended transversely of the bed of the machine A adjacent to an end thereof is a main shaft 3 which is mounted for rotary movement in suitable bearings (not shown) supported by the bed of the machine. The main shaft 3 has fixedly mounted thereon a gear wheel 4, the teeth of which are arranged to mesh with the teeth of a pinion 5 which is mounted on a shaft 6, said shaft 6 being mounted for rotation in a bearing 7 extended transversely of the machine above the bed thereof. Also mounted on the shaft 6 is a pulley 8, over which a power transmission belt 9 operates, this belt operating also over a smaller pulley 10 mounted on the power shaft 11 of an electric motor 12. The electric motor 12 is supported by suitable bracket means 13 which in turn is secured to a structure 14 of which the bearing 7 forms a part, the structure 14 being secured to and extended upwardly from the bed of the machine. It is obvious that rotary movement initiated by the motor 12 will be transmitted from the pulley 10 to the pulley 8 by the belt 9 so as to rotate the shaft 6 and thereby transmit rotary motion to the main shaft 3 of the machine through the pinion 5 and the gear wheel 4.

Fixedly mounted on the main shaft 3 of the machine A is a worm 15 with which a worm wheel 16 is arranged in mesh. The worm wheel 16 is mounted on a shaft 17 which extends longitudinally of the machine, said shaft being mounted for rotation in suitable bearings 18. At the end of the shaft 17 opposite to the end thereof at which the worm wheel 16 is mounted, a rotary nut-receiving member 19 is fixed to said shaft for rotary movement therewith. The rotary nut-receiving member 19 includes outwardly extended and circumferentially spaced portions 20 each of which is provided with a nut receiving pocket 21. It is to be noted, that the nut-receiving pockets 21 are not parallel with respect to the axis of the shaft 17, but instead said pockets are extended longitudinally at a slight angle relative to the axis of the shaft 17 as shown to the best advantage in Figs. 1 and 2.

The nut-cracking machine A includes a hopper which receives nuts to be cracked by the machine, said hopper including a tapered upper portion 22 which communicates with a lower hopper 23 that is provided with an inclined lower wall 23' which leads to a curved bottom portion of the hopper. An endless conveyor 24 is arranged at an end wall of the hopper portion 23, said endless conveyor comprising upper and lower sprocket wheels 25 and 26 over which operates a sprocket chain 27 that is provided with spaced nut-receiving elements 28. It is to be noted that one flight of the endless sprocket chain 27 of the conveyor 24 moves upwardly within the hopper portion 23 in contact with the inner face of the end wall 29 thereof, and that the other flight of said sprocket chain moves downwardly in a position outside of said hopper portion. The upper sprocket wheel 25 of the endless conveyor is fixed to a shaft 30 which is mounted in suitable bearings (not shown) and the lower sprocket wheel 26 is mounted on a shaft 31 which likewise is supported by suitable bearing means (not shown). The sprocket chain 27 of the conveyer 24 receives its movement through the instrumentality of a sprocket chain 32 which operates over sprocket wheels 33 and 34 mounted on the shafts 3 and 31, respectively.

The rotary nut-receiving member 19 is disposed within a housing 35 which includes an upper inclined wall 36 and a lower discharge chute 37. In the operation of the machine illustrated in the drawings each nut-receiving element 28 of the endless conveyor 24 picks up a nut as said nut-receiving element passes upwardly through the hopper of the machine, wherein a store of nuts is maintained. As each nut-receiving element 28 passes over the upper sprocket wheel 25 the nut carried thereby is discharged therefrom onto the inclined wall 36, said nut sliding down said inclined wall into the main portion of the housing 35 of the rotary nut receiving member 19 where said nut is received by a pocket of said rotary nut-receiving member. The rotary nut-receiving member 19 is constantly rotated during operation of the machine and the nut so deposited in a pocket thereof is carried around by the nut receiving member, said nut being cracked during its travel with the nut-receiving member in a manner to be hereinafter explained, and being thereafter discharged in a cracked condition from the discharge chute 37.

The nut-cracking machine A includes as a part thereof an improved compensating mechanism which provides for the proper cracking pressure being applied to various nuts, even though they are of different lengths. This compensating mechanism is shown in Figs. 3 to 10, inclusive, wherein the compensating mechanism is designated generally by the reference character C. The compensating mechanism C comprises a movable die 38, which is movable toward and from a fixed die 39, said fixed die being supported by a stationary part of the machine. The dies 38 and 39 are provided with nut-receiving cavities 40 formed in their nut-contacting faces.

The movable die 38 throughout its forward portion is circular in cross-section, while the rear portion of said movable die is of rectangular cross-section as shown to the best advantage in Figs. 5 and 6, there being a shoulder 38' at the point where the circular forward portion of the movable die meets the rectangular rear portion thereof. The movable die 38 is supported by a carriage 41, said carriage being provided with an opening 42 which includes a portion 42a shaped and dimensioned to receive the rectangular rear portion of the movable die for sliding movement therein. The carriage 41 in turn is supported for reciprocatory movement in a guideway 43 provided by a portion of the bed of the machine. The carriage 41 at its rear end is provided with transversely spaced apart portions 44 in which alined apertures 45 are formed (Figs. 3 and 4), and these apertures receive the opposite end portions of a pin 46, said pin serving to pivotally connect to said carriage the forward end portion of a link 47 whose rear end portion is pivotally connected to a disk 48 (Figs. 1 and 2) fixedly mounted on the shaft 3 whereby rotary movement of the shaft 3 and disk 48 will subject the carriage to reciprocatory movement.

The movable die 38 has formed longitudinally therein an opening 49 which is open at the rear end of the die as shown in Fig. 4, the portion of said opening formed in the rear portion of the movable die being of relatively large diameter, and said large diametered rear portion of the opening being provided with a shoulder 50 at its forward end where it meets an opening portion 49a of smaller diameter. Also this opening portion 49a terminates at its forward end in an enlarged opening portion 49b which is screwthreaded throughout its forward portion as shown in Fig. 4. This screwthreaded opening portion 49b receives the screwthreaded shank of the forward portion 38a of the movable die, this forward die portion being provided with the nut receiving cavity 40 previously mentioned herein as being a part of the movable die, and having an extension of the opening 49 formed therein. Also a split washer 38b is interposed between faces of the forward portion and the rearward portion of the movable die to prevent unintended rotation of the forward portion of the movable die with respect to the rearward portion thereof.

Disposed within the rear portion of the opening 49 formed in the movable die 38 is a coil spring 51 which contacts at its forward end with the shoulder 50. At its rear end the coil spring 51 contacts with a sleeve 52 which is disposed within the rear portion of the opening 49 and is supported by the carriage 41. Obviously, because the coil spring 51 tends to expand it normally maintains the movable die 38 in its forward position with respect to the carriage 41, however, as will be hereinafter described, the movable die is held stationary during a certain phase of the operation of the machine while the carriage 41 moves forwardly relative to the movable die, and during such movement of the carriage with respect to the movable die the coil spring 51 is compressed. The movable die 38 has formed in a side face thereof teeth 54 which serve a function to be hereinafter set forth.

As stated above the movable die 38 and the carriage 41 are normally arranged for relative movement. However at a certain time during the operation of the machine the movable die 38 is locked to the carriage so that said movable die will move with the carriage. In order to lock the movable die to the carriage as described the improved machine includes a locking mechanism which includes a member 55 which is disposed for sliding movement in a portion 42b of the opening 42 formed in the carriage 41 as shown to the best advantage in Figs. 3, 4, and 5. The forward portion 55a of the member 55 is of cylindrical form as shown in Fig. 5, this cylindrical portion extending from the forward end of the member 55 to the shoulder 56 (Fig. 3). The rearward portion 55b of the member 55 is of rectangular cross-section, said rectangular rearward portion extending from the shoulder 56 to the rear end of the member 55. The rearward portion 55b of the member 55 is provided with an inclined face 57 which is disposed at an angle of approximately 45° with respect to the opposed side faces of the member 55, and the member 55 includes a lower portion 58 which extends rearwardly of the inclined face 57 and this portion 58 is provided with a flange 59 which is disposed in parallelism relative to the inclined face 57 (Fig. 8).

Arranged in rearwardly spaced relation with respect to the member 55 is an element 60 which is supported by the carriage for sliding movement with respect thereto, said element 60 being disposed in a portion of the opening 42 of said carriage as shown in Fig. 10. The element 60 is of bifurcated formation as shown to the best advantage in Figs. 9 and 10; that is to say said element is provided with a head or bridge portion 60a at the forward end thereof from which are extended rearwardly, upper and lower integral legs 60b and 60c which are spaced apart vertically to provide a space therebetween (see Fig. 10). The head or bridge portion 60a of the element 60 is provided at its forward end with related, divergent inclined faces 61 and 62, as shown in Fig. 9, and at the rearward end of said head or bridge portion a flat face 63 is provided with which is associated a slightly inclined face 64. The carriage 41 has formed therein a screwthreaded opening 65 (Fig. 10) in which the lower, screwthreaded end portion of an upstanding pin 66 is screwthreadedly disposed, said pin 66 being provided with a flange 66' which contacts with a face within the opening 42 of the carriage at the lower portion of said opening to limit downward movement of the screwthreaded lower portion of the pin 66 into the screwthreaded opening 65. The pin 66 extends upwardly through an elongated opening 67 formed through the lower leg 60c of the element 60, and this elongated opening has associated with it an elongated recess 67' in which the flange 66' of the pin 66 is disposed.

Mounted on the upper portion of the pin 66 for rotary movement with respect thereto is a rotary member 68, said rotary member being provided with a centrally located opening in which said upper portion of said pin 66 is disposed. The rotary member 68 is disposed horizontally in the space between the rearwardly extended legs 60b and 60c of the element 60 with the top face of the rotary member contacting with the lower face of the top leg 60b and the lower face of said rotary member contacting with the upper face of the leg 60c as shown in Fig. 10. The circumferential face of the rotary member is concentric with the circumferential face of the pin 66 throughout most of the length of said circumferential face of said rotary member, but through a portion of said circumferential face of said rotary member 68 a cam face 69 is formed which is a part of the continuous circumferential face of said rotary member. Also the rotary member 68 has an extension 70 formed thereon which is provided with an angularly extended tail portion 70', and the outer end face of said tail portion of said extension contacts with the rear end face of the movable die 38.

In order to maintain the outer end face of the tail portion of the extension 70 in contact with the rear end face of the movable die 38, the upper leg 60b of the element 60 is provided with a cavity 71 in which a block 72 is disposed for sliding movement. The block 72 has fixed thereto a pin 73 which extends downwardly from the block with the lower portion of said pin extended into an enlarged opening formed in the rotary member 68, said pin being extended through an elongated opening formed in the portion of the leg 60b of the element 60 which provides the lower wall of the cavity 71. The block 72 is provided with a horizontal pin 74 (Fig. 8) which is surrounded by a coil spring 75, said coil spring being in contact at one of its ends with a face of the block 72 and at its opposite end with a pin 76 which extends transversely through the cavity 71. The coil spring 75 tends to move the block 72 to the left in Figs. 3 and 8, and because of cooperation of the pin 73 with the rotary member 68 said coil spring tends to rotate said rotary member so as to maintain the outer end face of the tail portion 70' of the extension 70 of said rotary member in firm contact with the rear end face of the movable die 38.

Disposed between the member 55 and the element 77 is a locking element 77 which is of generally rectangular shape when viewed in vertical section as shown in Fig. 6, said locking element being provided with teeth 78 adapted to interlock with the teeth 54 of the movable die 38. At its forward end the locking element 77 is provided with an inclined face 79 that contacts with the inclined face 57 of the member 55, and at its rear end the locking element 77 is provided with inclined faces 77a and 77b which correspond, generally, with the arrangement of the inclined faces 61 and 62 of the element 60. The inclined face 77a of the locking element 77 contacts with the inclined face 61 of the element 60 while the inclined face 77b of said locking element is spaced apart slightly from the inclined face 62 of said element 60. The locking element 77 has formed therein a groove 80 which receives the flange 59 formed on the member 55, the groove 80, of course, being inclined in accordance with the inclination of said flange. The flange 59 of the member 55 is cut away at its approximate longitudinal center as shown in Figs. 4 and 8 to provide a receiving space for a coil spring 81, said cutaway portion of the flange being open at the upper edge of the flange and the coil spring 81 being interposed between an end wall of the cutaway portion and a disk 82. Also the groove 80 formed in the locking element 77 is of slightly reduced width at the lower portion of said locking element to provide shoulders 80' with which the lower face of the disk 82 contacts. The coil spring 81 is adapted to expand and therefore said coil spring tends to move the locking element away from the movable die when the teeth of said locking element are in engagement with the teeth of said movable die.

Arranged within the cylindrical forward portion of the memebr 55 is an element 83 which comprises a shank portion having an enlarged head at its outer end. The opening 84 formed in the cylindrical forward portion of the member 55 comprises a forward portion of relative large diameter and a rear portion of smaller diameter with an annular shoulder 84' at the point where the larger and smaller opening portions meet, the larger opening portion being large enough to receive the enlarged head of the element 83, while the smaller, rear opening portion is only large enough to receive the shank portion of said element 83 (Fig. 4). A coil spring 85 is interposed between the inner face of the head of the element 83 and the shoulder 84' whereby said coil spring tends to move the element 83 outwardly with respect to the opening 84. Outward movement of the element 83 is limited by a pin 86 which is extended through the inner portion of the shank of said element and projects into enlarged openings 87 which are formed in portions of the member 55 at opposite sides of the smaller, rear portion of the opening 84 in the member 55, the opposite end portions of said pin normally contacting with the forward portion of the walls of said openings 87 as shown in Fig. 4.

The bed of the machine is provided with a forwardly extended and upwardly projected portion 88 which supports the fixed die 39 heretofore referred to, said fixed die comprising an enlarged head portion and a shank portion which are disposed in opening portions formed in the upwardly extended portion of the portion 88 and said fixed die being secured in place by a nut 39' (Fig. 4). The upwardly projected portion of the portion 88, also supports an elongated element 89, said elongated element being provided with a screwthreaded portion 89' which is disposed in a screwthreaded opening 90 formed in the upwardly projected portion of the portion 88, and said elongated element being adjustable longitudinally of its axis by rotating same. The elongated element 89 may be locked in positions to which it is so adjusted by a set screw 91. The elongated element 89 extends rearwardly of the machine to a position where its rear end may be contacted by the outer face of the head of the element 83 for a purpose to be hereinafter described.

The movable die 38 of the machine has associated therewith a nut ejector 92 (Fig. 7) which is disposed in the opening 49 formed through said movable die, said ejector being in the form of a rod having a rear portion of relative large diameter and a forward portion of smaller diameter so that said ejector portions may fit closely in the larger and smaller diametered portions of the opening 49. The rear portion 92' of the ejector 92 is turned at an approximate right angle with respect to the remainder of the ejector and this portion 92' of the ejector is adapted to extend through an elongated slot formed in the top wall of the carriage and is disposed in an aperture 93 formed in a boss 94 formed on a cover plate 95 of the portion of the head of the machine which supports the carriage 41. The ejector 92 is secured in place by a pin 92a and said ejector is of such length that the forward end thereof is disposed within the opening 49 of the movable die 38 when said movable die is in its forwardly projected position as shown in Fig. 4. However when a nut cracking operation has been performed, in a manner to be hereinafter explained, and the movable die moves rearwardly relative to the stationary ejector 92, the forward portion of the movable die will be moved rearwardly of the forward portion of the ejector 92 as shown in Fig. 3 whereby a nut which may have become lodged in the cavity 40 of the movable die will be ejected therefrom by the nut ejector.

The fixed die 39 is likewise provided with nut ejecting means which comprises a rod 96 which is supported for sliding movement by the vertically projected portion of the portion 88 and by the wall 97 which constitutes a part of the bed of the machine (Fig. 8). The rod 96 is of approximately J-shape, and extended forwardly from the short leg 96' of said rod is an ejector pin 98 which extends into an opening 99 formed longitudinally through the fixed die 39 (Fig. 3). The rod 96 has extended therefrom a pin 100 to which is attached one end of a coil spring 101, the opposite end of said coil spring being attached to an extension 102 projected from the wall 97 of the bed of the machine. The coil spring tends to move the ejector rod 96 rearwardly of the machine so that the forward portion of the ejector pin 98 will be extended into the cavity 40 of the fixed die 39. However when the movable die moves toward the fixed die to perform a nut cracking operation the front plate 41' of the carriage 41 contacts with the rear end face of the ejector rod 96 as shown in Fig. 4 and moves said rod forwardly to move the ejector pin 98 out of the cavity 40 of the fixed die and forwardly of the opening 99 of said fixed die as shown in Fig. 4. The ejector pin 98 remains in this position during the nut cracking operation, and when the nut cracking operation has been completed and the carriage 41 moves rearwardly of the machine, the coil spring 101 will move the ejector rod 96 rearwardly of the machine to move the ejector pin through the opening 99 of the fixed die and project the end portion of said ejector pin into the cavity 40 of said fixed die. Such movement of the end portion of the ejector pin into the cavity 40 of the fixed die will eject a nut therefrom which has become lodged therein during the cracking operation.

In the operation of the machine, the nuts to be cracked are carried around in the pockets 21 of the rotary nut-receiving member 19 which is subjected to constant rotation during operation of the machine. As each pocket approaches the nut cracking position it passes between the adjacent ends of the movable die 38 and the fixed die 39, as shown to the best advantage in Fig. 3. As the nut to be cracked approaches the cracking position the carriage 41 and the movable die 38 are moving forwardly of the machine as a unit and eventually the forward end of the movable die contacts with the nut to be cracked and moves said nut into contact also with the fixed die 39 as shown in Fig. 4, the inclined arrangement of the pockets 21 permitting the movable die 38 to move into the pocket while the rotary nut-receiving member is rotating. At this point it is to be noted that the movable die 38 and the fixed die 39 are provided with projections 103 and 104, respectively, which serve to adjust the nut to its proper cracking position between said dies. Also the fixed die 39 is provided with a slot 105 which receives the projection 103 of the movable die when said movable die is moved into very close relation with respect to the fixed die.

When the nut to be cracked is positioned between the movable die 38 and the fixed die 39 as described further forward movement of the movable die is arrested, but the carriage 41, with the parts associated therewith continues its forward movement in response to rotation of the disk 48 on the shaft 3, to which the carriage is operably connected by the link 47. During such forward movement of the carriage 41 with respect to the movable die 38 the coil spring 51 is compressed, and the movement of the carriage relative to the arrested movable die will cause the rotary member 68 to be rotated about the pin 66 because of contact with the rear end face of the arrested movable die 38 of the tail portion of the extension 70 of said rotary member. Such rotation of the rotary member 68 will cause it to move from the position in which it is shown in Fig. 3 to the approximate position in which it is shown in Fig. 9 whereby the cam face 69 of the rotary member 68, rotating against the straight face 64 of the element 60, will move forwardly of the carriage, as a unit, the element 60, the locking element 77, the member 55, and the element 83 associated with said member 55. It is plain that during the forward movement relative to the carriage of the unit made up of the element 60, the locking element 77, the member 55, and its associated element 83, the locking element 77 will not be cammed toward the movable die 38 because at this time such forward movement of the parts mentioned is not resisted in any manner. Thus, the forward movement of the carriage, and the independent forward movement of the unit made up of the element 60, the locking element 77, the member 55, and the element 83, continues and when the carriage has moved the proper distance forwardly the element 83 contacts with the end of the elongated element 89. When this phase of the operation of the machine is reached forward movement of the carriage 41 continues but contact between the elongated element 89 and the element 83 arrests forward movement of said element 83, and its associated member 55, with the carriage. Now, as the forward movement of the carriage continues the inclined face 79 of the locking element 77 is forced against the inclined face 57 of the now stationary member 55 by the element 60, and through cooperation of the associated inclined faces 57 and 79 and the associated inclined faces 61 and 77a the locking element 77 will be cammed toward the movable die 38 to force the teeth of said locking element into engagement with the teeth of the movable die. The forward movement of the carriage continues after the movable die 38 has been locked to the carriage as described and at this time only a very slight forward movement of the carriage remains. During this final portion of the forward movement of the carriage the movable die 38 moves forwardly with the carriage and such forward movement of the movable die with the carriage cracks the shell of the nut between the movable die 38 and the fixed die 39. During the final nut cracking movement of the movable die and the carriage, the element 83 is held stationary because of contact between the elongated element 89 and said element 83, and the forward movement of the member 55 with the carriage compresses the coil spring 85. However because of its strength this spring is not compressed when the locking element 77 is cammed toward the movable die to lock said movable die to the carriage.

When the nut has been cracked, the carriage continuing its uninterrupted movement moves rearwardly, the forward plate 41' of the carriage engaging the shoulder 38' of the movable die 38 (Fig. 4) to cause said movable die to move rearwardly with the carriage. Such rearward movement of the movable die with the carriage causes the stationary ejector 92 associated with the movable die to be eventually projected into the cavity 40 of the movable die to dislodge the nut if it should become wedged in said cavity 40. Likewise rearward movement of the carriage will permit the coil spring 101 to move the ejector pin 98 forwardly into the cavity 40 of the fixed die 39 to dislodge the nut if it should become wedged in said cavity.

As the carriage moves rearwardly after the nut cracking operation, the locking element 77 remains in the position where its teeth are engaged with the teeth 54 until the shoulder 38' of the moving die contacts with the plate 41'. Then the element 83 moves away from the elongated element 89 and the coil spring 81 moves the locking element 77 away from the moving die to disengage the teeth 78 of the locking element from the teeth 54 of the moving die. This is an important feature of the invention inasmuch as the moving die remains locked to the carriage 41 of the machine until backed away from the cracked nut, thereby allowing no spring pressure on meat of the cracked nut which might crush said nut meat. Because no spring pressure is permitted against the cracked nut, the coil spring 51 may be heavier than would be otherwise possible, and said heavy coil spring 51 serves to seat the nuts firmly between the dies before the cracking pressure is applied to the nuts, so that there will be no slippage of the nuts, between the dies when the final cracking pressure is applied to the nuts.

Figure 2:
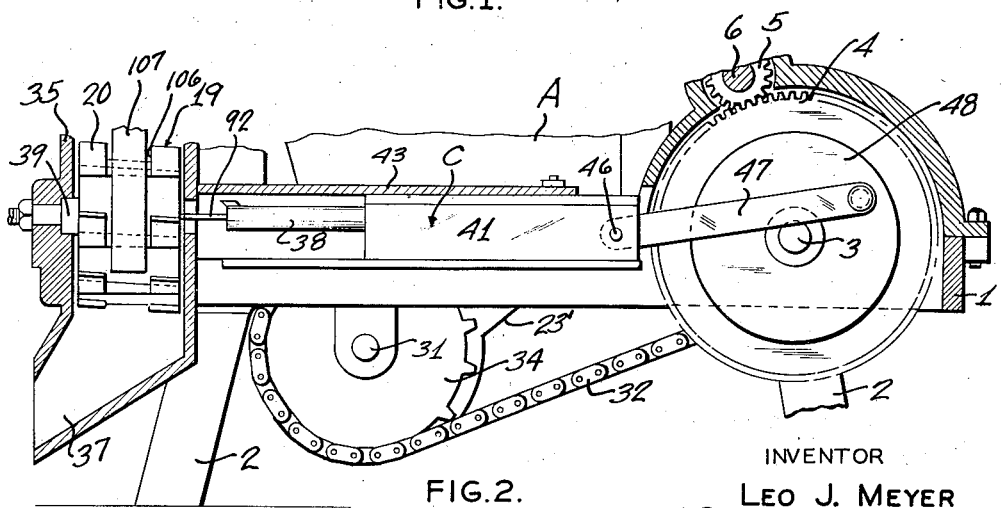
Fig. 2 is a fragmentary vertical section of the lower portion of the machine illustrated in Fig. 1.

The rotary nut-receiving member 19 rotates continuously during operation of the machine and after the nut has been cracked it is carried to a lower position by the rotary nut-receiving member where it may fall from the pocket thereof into the chute 37 by which it is discharged from the machine. With respect to the rotary nut-receiving member 19 it is to be noted that the peripheral faces of the portions 20 thereof are provided with circumferentially alined grooves 106 which, during rotation of the rotary nut-receiving member receive a curved bar 107 which is pivoted to a stationary part of the machine at 108 (Fig. 1). This bar serves to straighten the nuts in the pockets 21 of the rotary nut-receiving member 19 as said nuts approach the nut cracking position.

An important feature of the invention is that the opening formed longitudinally of the movable die 38 and the opening formed longitudinally of the fixed die 39 receive the pointed opposite ends of the nut being cracked as shown in Fig. 4. This provides for properly positioning the nut between the cracking dies of the machine so that shell bursting pressure is applied by the dies at points where the shell of the nut will be properly cracked.

A matter of extreme importance in connection with the present invention has to do with the arrangement for shifting the unit comprised of the element 60, the locking element 77, the member 55, and the element 83, associated with said member 55, forwardly of the carriage of the machine in response to rotation of the rotary member 68 as has been previously explained herein. By so shifting the parts mentioned forwardly of the carriage, different and proper amounts of shell crushing movement are directed against nuts being cracked which are of different lengths. In other words, the forward movement of the carriage of the machine is fixed at all times and if the element 83 always moved with the carriage without being shifted with respect thereto, the same amount of shell-cracking movement would be directed by the die 38 against each nut regardless of its length unless the elongated element 89 be adjusted longitudinally for nuts of different lengths. However by providing the machine with means for shifting the element 83 forwardly of the carriage in accordance with the lengths of the nuts being cracked, the element 83 will meet the elongated element 89 earlier when longer nuts are being cracked than when shorter nuts are being cracked and therefore the longer nuts would be subjected to the required longer shell-cracking movement of the die 38 than would shorter nuts. It is plain that shifting of the element 83 starts as soon as forward movement of the movable die 38 with the carriage is arrested by a nut between said movable die and the fixed die, and therefore if the nut being cracked is relatively long the distance which said element 83 is shifted is relatively great, while in the cases of shorter nuts being cracked the element 83 is shifted lesser distances depending on the particular lengths of the shorter nuts. It is obvious, therefore, that the means for shifting the element 83 in accordance with the lengths of the nuts being cracked assures that each nut, regardless of its length, shall receive the proper degree of shell-cracking movement of the die 38 to properly crack the shell of the nut without injuring the meat thereof.

The coil spring 51 which is associated with the movable die 38, as shown to good advantage in Fig. 7, may, if desired, be aided in its operation by a second coil spring 110 which is arranged in embracing relation with respect to an elongated pin 111. The elongated pin 111 has fixed to, or has arranged integral with, its rear end a head 112 which is fixedly mounted in an opening 112' formed in the carriage 41 and said elongated pin extends forwardly of said carriage from said head. Associated with the elongated pin 111 is a sleeve 113 which is provided with an opening at its forward end through which the elongated pin extends, said sleeve having formed therein also an elongated opening 114 of larger diameter in which the forward portion of the coil spring 110 is disposed with the forward end of said coil spring 110 in contact with a shoulder located at the point where the larger opening 114 meets the smaller forward opening of the sleeve through which the pin 111 extends. The opposite, or rear end, of the coil spring 110 contacts with the head 112 at the rear end of the elongated pin 111, and the sleeve 113 is provided with an extension 115 which is projected into a correspondingly shaped and proportioned notch formed in the movable die 38.

The advantage of this arrangement is that the combined pressure exerted forwardly of the movable die 38 by the combined coil springs 51 and 110 serves to insure firm gripping between the movable die 38 and the fixed die 39 of a nut being cracked without such pressure being excessive so that there is danger of the meat of a cracked nut being crushed by said pressure. In other words if a single spring 51 were employed which was sufficiently heavy to insure proper gripping of a nut between the movable die and the fixed die, the pressure exerted against the nut by said heavy spring might crush the meat of a cracked nut. However by employing a coil spring 51 which is not relatively heavy and by aiding the action of that coil spring by employing a secondary coil spring 110, as shown in Fig. 7, the desired pressure is applied to a nut between the movable die and the fixed die to properly hold it in place, without that pressure being so excessive as to crush the meat of the nut.

I claim:

1. A nut cracking machine comprising a frame, a carriage adapted for reciprocatory movement with respect to said frame, a fixed nut cracking die, a movable nut cracking die supported by said carriage for sliding movement with respect thereto, means supported by said carriage for locking said movable die to said carriage for movement therewith during actual nut cracking movement of said carriage, said locking means comprising spaced apart members having inclined faces, a locking element disposed between said spaced apart members and having inclined faces which contact with the inclined faces of said spaced apart members, a yieldably supported plunger associated with one of said spaced apart members, and an element adapted to be contacted by said yieldably supported plunger to cause the inclined faces of said spaced apart members and said locking element to be forced against each other to move said locking element into locking engagement with said movable die, and means for shifting said spaced apart members and said locking element relative to said carriage in accordance with the length of a nut being cracked to regulate the time at which said plunger is moved into contact with said element to move said locking element into engagement with said movable die, said shifting means including a movable element supported by said carriage and to which movement is imparted in response to relative movement of said carriage and said movable die for moving said spaced apart members and said locking element relative to said carriage.

2. A nut cracking machine comprising a frame, a carriage adapted for reciprocatory movement with respect to said frame, a fixed nut cracking die, a movable nut cracking die supported by said carriage for sliding movement with respect thereto, means supported by said carriage for locking said movable die to said carriage for movement therewith during actual nut cracking movement of said carriage, said locking means comprising spaced apart members having inclined faces, a locking element disposed between said spaced apart members and having inclined faces which contact with the inclined faces of said spaced apart members, a yieldably supported plunger associated with one of said spaced apart members, and an element adapted to be contacted by said yieldably supported plunger to cause the inclined faces of said spaced apart members and said locking element to be forced against each other to move said locking element into locking engagement with said movable die, and means for shifting said spaced apart members and said locking element relative to said carriage in accordance with the length of a nut being cracked to regulate the time at which said plunger is moved into contact with said element to move said locking element into engagement with said movable die, said shifing means including a rotatably movable element supported by said carriage and to which movement is imparted in response to relative movement of said carriage and said movable die for moving said spaced members and said locking element relative to said carriage.

3. A nut cracking machine comprising a frame, a carriage adapted for reciprocatory movement with respect to said frame, a fixed nut cracking die, a movable nut cracking die supported by said carriage for sliding movement with respect thereto, means supported by said carriage for locking said movable die to said carriage for movement therewith during actual nut cracking movement of said carriage, said locking means comprising spaced apart members having inclined faces, a locking element disposed between said spaced apart members and having inclined faces which contact with the inclined faces of said spaced apart members, a yieldably supported plunger associated with one of said spaced apart members, and an element adapted to be contacted by said yieldably supported plunger to cause the inclined faces of said spaced apart members and said locking element to be forced against each other to move said locking element into locking engagement with said movable die, and means for shifting said spaced apart members and said locking element relative to said carriage in accordance with the length of a nut being cracked to regulate the time at which said plunger is moved into contact with said element to move said locking element into engagement with said movable die, said shifting means including a rotatable member supported by said carriage and provided with a cam face adapted to engage one of said spaced apart members, said rotatable member having a portion which is arranged in contact with said movable die whereby relative movement of said movable die and said carriage will rotate said rotatable member to move the cam face thereof against said one of said spaced apart members to shift said spaced apart members and said locking element relative to the carriage.

4. A nut cracking machine comprising a frame, a carriage adapted for reciprocatory movement with respect to said frame, a fixed nut cracking die, a movable nut cracking die supported by said carriage for sliding movement with respect thereto, means supported by said carriage for locking said movable die to said carriage for movement therewith during actual nut cracking movement of said carriage, said locking means comprising spaced apart members having inclined faces, a locking element disposed between said spaced apart members and having inclined faces which contact with the inclined faces of said spaced apart members, a yieldably supported plunger associated with one of said spaced apart members, and an element adapted to be contacted by said yieldably supported plunger to cause the inclined faces of said spaced apart members and said locking element to be forced against each other to move said locking element into locking engagement with said movable die, and means for shifting said spaced apart members and said locking element relative to said carriage in accordance with the length of a nut being cracked to regulate the time at which said plunger is moved into contact with said element to move said locking element into engagement with said movable die, said shifting means including a rotatable member supported by said carriage and provided with a cam face adapted to engage one of said spaced apart members, said rotatable member having a portion which is arranged in contact with said movable die whereby relative movement of said movable die and said carriage will rotate said rotatable member to move the cam face thereof against said one of said spaced apart members to shift said spaced apart members and said locking element relative to the carriage, and means for maintaining said portion of said rotary member in contact with said movable die.

5. A nut cracking machine comprising a frame, a carriage adapted for reciprocatory movement with respect to said frame, a fixed nut cracking die, a movable nut cracking die supported by said carriage for sliding movement with respect thereto, means supported by said carriage for locking said movable die to said carriage for movement therewith during actual nut cracking movement of said carriage, said locking means comprising spaced apart members having inclined faces, a locking element disposed between said spaced apart members and having inclined faces which contact with the inclined faces of said spaced apart members, a yieldably supported plunger associated with one of said spaced apart members, and an element adapted to be contacted by said yieldably supported plunger to cause the inclined faces of said spaced apart members and said locking element to be forced against each other to move said locking element into locking engagement with said movable die, and means for shifting said spaced apart members and said locking element relative to said carriage in accordance with the length of a nut being cracked to regulate the time at which said plunger is moved into contact with said element to move said locking element into engagement with said movable die, said shifting means including a rotatable member supported by said carriage and provided with a cam face adapted to engage one of said spaced apart members, said rotatable member having a portion which is arranged in contact with said movable die whereby relative movement of said movable die and said carriage will rotate said rotatable member to move the cam face thereof against said one of said spaced apart members to shift said spaced apart members and said locking element relative to the carriage, and means including a spring for maintaining said portion of said rotary member in contact with said movable die.

6. A nut cracking machine comprising a frame, a carriage adapted for reciprocatory movement with respect to said frame, a fixed nut cracking die, a movable nut cracking die supported by said carriage for sliding movement with respect thereto, and means which tends to move said movable die forwardly relative to said carriage in the direction of the location of said fixed die, said means comprising a main coil spring which is disposed in an opening formed in said movable die in such manner that it tends to move said movable die, a secondary coil spring, and a movable element connected to said movable die against which said secondary coil spring bears whereby said secondary coil spring tends to move said element and said movable die.

7. A nut cracking machine comprising a frame, a carriage adapted for reciprocatory movement with respect to said frame, a fixed nut cracking die, a movable nut cracking die supported by said carriage for sliding movement with respect thereto, and means which tends to move said movable die forwardly relative to said carriage in the direction of the location of said fixed die, said means comprising a main coil spring which is disposed in an opening formed in said movable die in such manner that it tends to move said movable die, a secondary coil spring, and a movable sleeve element connected to said movable die against which said secondary coil spring bears whereby said secondary coil spring tends to move said element and said movable die.

8. A nut cracking machine comprising a frame, a carriage adapted for reciprocatory movement with respect to said frame, a fixed nut cracking die, a movable nut cracking die supported by said carriage for sliding movement with respect thereto, means supported by said carriage for locking said movable die to said carriage for movement therewith during actual nut cracking movement of said carriage, said locking means comprising a member having an inclined face, a locking element disposed adjacent to said member and having an inclined face which contacts with the inclined face of said member, a yieldably supported plunger, and an element adapted to be contacted by said yieldably supported plunger to cause the inclined faces of said member and said locking element to be forced against each other to move said locking element into locking engagement with said movable die, and means for shifting said member and said locking element relative to said carriage in accordance with the length of a nut being cracked to regulate the time at which said plunger is moved into contact with said element to move said locking element into engagement with said movable die, said shifting means including a movable element supported by said carriage and to which movement is imparted in response to relative movement of said carriage and said movable die for moving said member and said locking element relative to said carriage.

LEO J. MEYER.